United States Patent [19]

Chronowski

[11] 4,344,372
[45] Aug. 17, 1982

[54] FLUIDIZED BED COMBUSTION DEVICE

[75] Inventor: Robert A. Chronowski, Great Falls, Va.

[73] Assignee: Aqua-Chem, Inc., Milwaukee, Wis.

[21] Appl. No.: 164,034

[22] Filed: Jun. 30, 1980

[51] Int. Cl.³ .............................................. F23G 5/00
[52] U.S. Cl. .................... 110/245; 431/158; 122/4 D; 432/58; 34/57 A
[58] Field of Search .................. 122/4 D; 110/245; 431/158; 432/58; 34/57 A, 57 B

[56] References Cited

U.S. PATENT DOCUMENTS

| | | | |
|---|---|---|---|
| 2,842,102 | 7/1958 | Blaskowski | 122/4D |
| 2,976,853 | 3/1961 | Hunter et al. | 122/4 D |
| 2,997,031 | 8/1961 | Ulmer | 122/4 D |
| 3,376,098 | 4/1968 | Pryor | 431/158 |
| 3,904,375 | 9/1975 | Calbeck | 34/57 A |
| 3,974,091 | 8/1976 | Parker et al. | 34/57 A |
| 4,240,378 | 12/1980 | Caplin | 122/4 D |
| 4,258,005 | 3/1981 | Ito et al. | 110/245 |
| 4,263,857 | 4/1981 | Ban . | |

FOREIGN PATENT DOCUMENTS

| | | | |
|---|---|---|---|
| 792682 | 4/1958 | United Kingdom | 122/4 D |
| 2001157 | 1/1979 | United Kingdom | 122/4 D |

*Primary Examiner*—Henry C. Yuen

[57] ABSTRACT

A fluidized bed combustion device adapted for use with a boiler has an air distributor consisting of a row of generally horizontally oriented, apertured sparge pipes or tubes disposed in a bed of inert particulate material. The center pipes in the row are connected to a start-up burner for receiving heated combustion products and excess air and the outer pipes in the row are connected to selectively receive air through a separate delivery path. During start-up and low load conditions, only the center pipes are pressurized and so that only the center portion of the bed is fluidized to minimize the heat input requirements. Once the central portion of the bed has been heated to the required temperature, primary fuel is delivered to sustain combustion without the start-up burner. At the completion of the start-up process and during high fire conditions all of the tubes are pressurized to fluidize the entire bed.

3 Claims, 2 Drawing Figures

FLUIDIZED BED COMBUSTION DEVICE

BACKGROUND OF THE INVENTION

This invention relates generally to fluidized bed boilers.

One type of boiler employs fluidized particles as a heat exchange medium. In such boilers, inert particles, such as sand, are placed in a fluidized state by air delivered from below through a porous plate or a tubular grid structure. The air also provides at least a portion of the oxygen required to burn fuel within the bed for heating the particles. In order to initiate the combustion process, an auxiliary burner may be provided to preheat the particulate material.

The particulate material represents a large mass which must be heated at start-up to a level sufficient to safely ignite and sustain combustion of the primary fuel. However, the high heat transfer coefficient existing between the bed and the transfer surface in fluidized bed systems has made start-up and low load operations difficult and somewhat dangerous, especially in steam or hot water boiler applications. Because conventional fluidized beds tend to rapidly reject heat, a significant heat input is required to reach the desired bed temperature. In some cases, heat inputs of up to twenty percent of the boiler rating are necessary to achieve primary fuel combustion temperature. Even when the temperature of the fluidized bed reaches or exceeds this temperature, there may still be great difficulty in maintaining bed temperature if boiler load is rapidly applied and if the start-up heat source is discontinued. It is not unusual for such a system to require heat inputs of up to thirty to forty percent of maximum load before the start-up burner may be safely shutdown.

Prior art attempts at achieving start-up and low load operation of fluidized bed systems have included the use of multiple cells or chambers, each containing a portion of the total system mass of bed material. This permits the bed material to be heated in stages during the start-up process. Another prior art system includes apparatus for the withdrawal of bed material to allow start-up and low load operation with a shallow bed and the delivery of additional bed material into the system as the temperature and load are increased. Such systems are not wholly satisfactory because they are relatively expensive and involve complex control considerations. Also, because of the necessity to remove and store or dispose of relatively hot bed material when the load is decreased, the material transport system presents safety hazards.

OBJECTS OF THE INVENTION

It is a primary object of the present invention to provide a new and improved fluidized bed combustor for boilers.

A further object of the invention is to provide a fluidized bed combustor for boilers which permits efficient start-up and low load operation without relatively expensive construction or complicated controls.

Another object of the present invention is to provide a fluidized bed combustor wherein the finely divided material may be segregated into insulating and active zones.

A further object of the present invention is to provide a fluidized bed combustor method and apparatus wherein an optimum quantity of fluidized bed material to be present at start-up and during operation at all loads.

A still further object of the present invention is to provide an apparatus and method for starting and operating a fluidized bed combustor for boilers wherein the operating time for the start-up heat source can be minimized.

Yet another object of the present invention is to provide a fluidized bed combustor apparatus and method wherein the active quantity of bed material can be controlled without the necessity for material transport and storage.

Another object of the present invention is to provide a fluidizing bed combustor which can be cycled between start-up, low load and full load in an efficient, safe and economical manner.

A still further object of the present invention is to provide an apparatus and method for start-up and low load operation of a fluidized bed combustor that is simple and easy to incorporate into existing boilers.

How these and other objects of the invention are accomplished will be described in the following specification taken in conjunction with the FIGURES. Generally, however, the objects are accomplished by providing a fluidizing grid assembly having individually controlled portions for selectively controlling the volume and flow paths of the fluidizing medium. The grid assembly is located within a mass of particulate bed material constituting the medium to be fluidized. A primary fuel injector is located for feeding fuel into the bed after the completion of start-up. The grid assembly preferably comprises a plurality of parallel-mounted, elongate tubular sparge elements grouped to form two outer portions with a central portion therebetween. Each tubular sparge element has a plurality of openings spaced along its length to permit flow of the fluidizing medium into the surrounding bed material. The central grid is connected to a conventional combustion chamber for receiving heated combustion products at a controlled rate so that the degree of fluidization in the central zone of bed material may be controlled.

Cool air is controllably directed to the two outer portions through controlled flow paths so that the outer portions of the bed may remain quiescent during start-up. These stagnant outer zones serve to insulate the active central zone during start-up and low load operation, thus permitting the central zone to more quickly and economically reach a predetermined temperature. After the central zone reaches the temperature necessary to ignite and sustain operation on the primary fuel alone, the outer zones may be pressurized in accordance with the load being imposed upon the system. The fluidizing grid assembly according to the present invention may be easily controlled to meet decreasing load demands by reversing the process described. With the grid assembly and process of the present invention, re-ignition of the start-up burner will typically be at an imposed load value of from fifteen to twenty-five percent of full load. By utilizing the fluidizing grid assembly to selectively activate a portion or all of the bed material as described above, a wide range of imposed loads may be safely and conveniently accommodated.

DESCRIPTION OF THE PREFERRED EMBODIMENT

Figure 1:
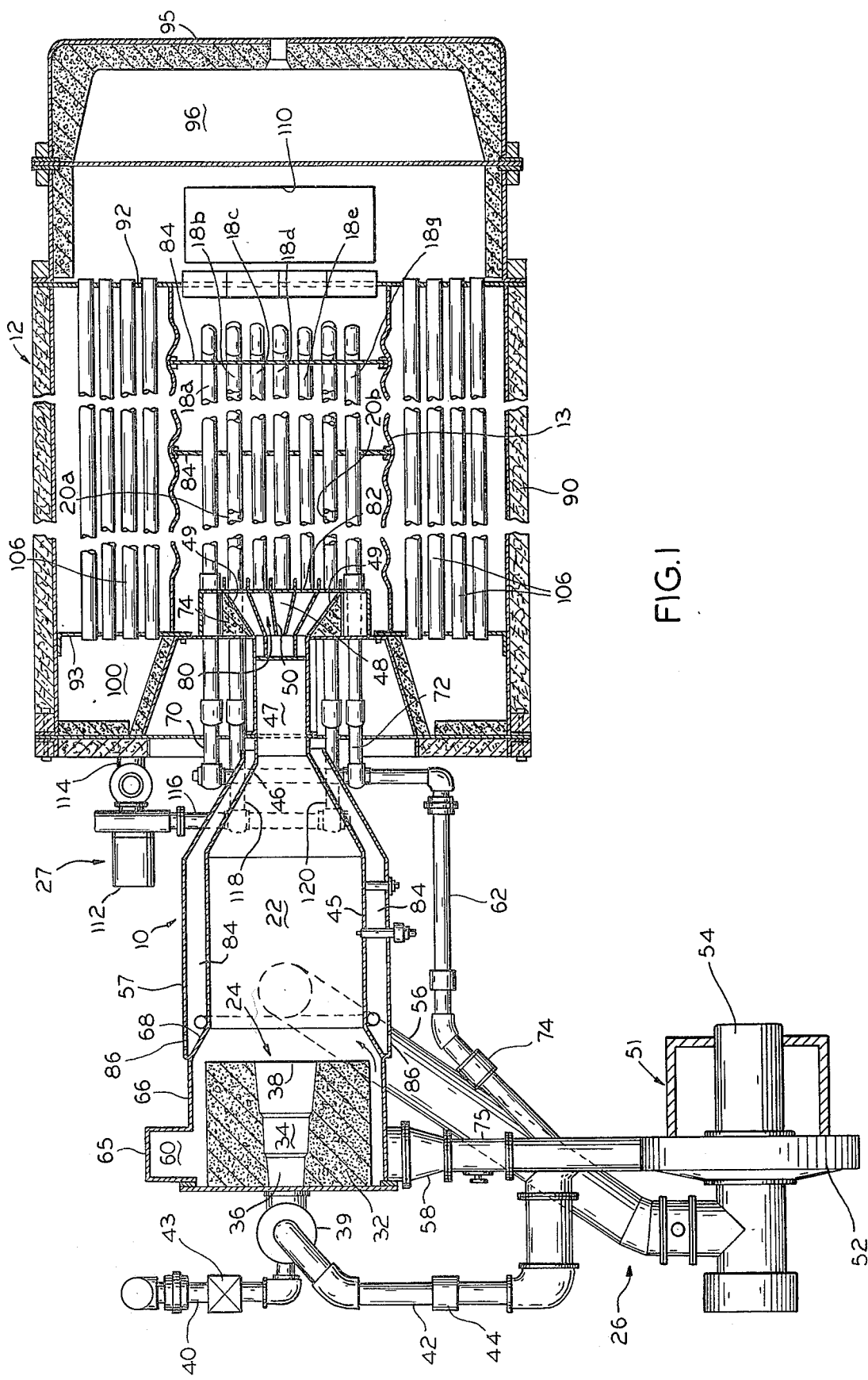
FIG. 1 is a side elevational view, partly in section of the fluidizing bed assembly of the present invention.
Figure 2:
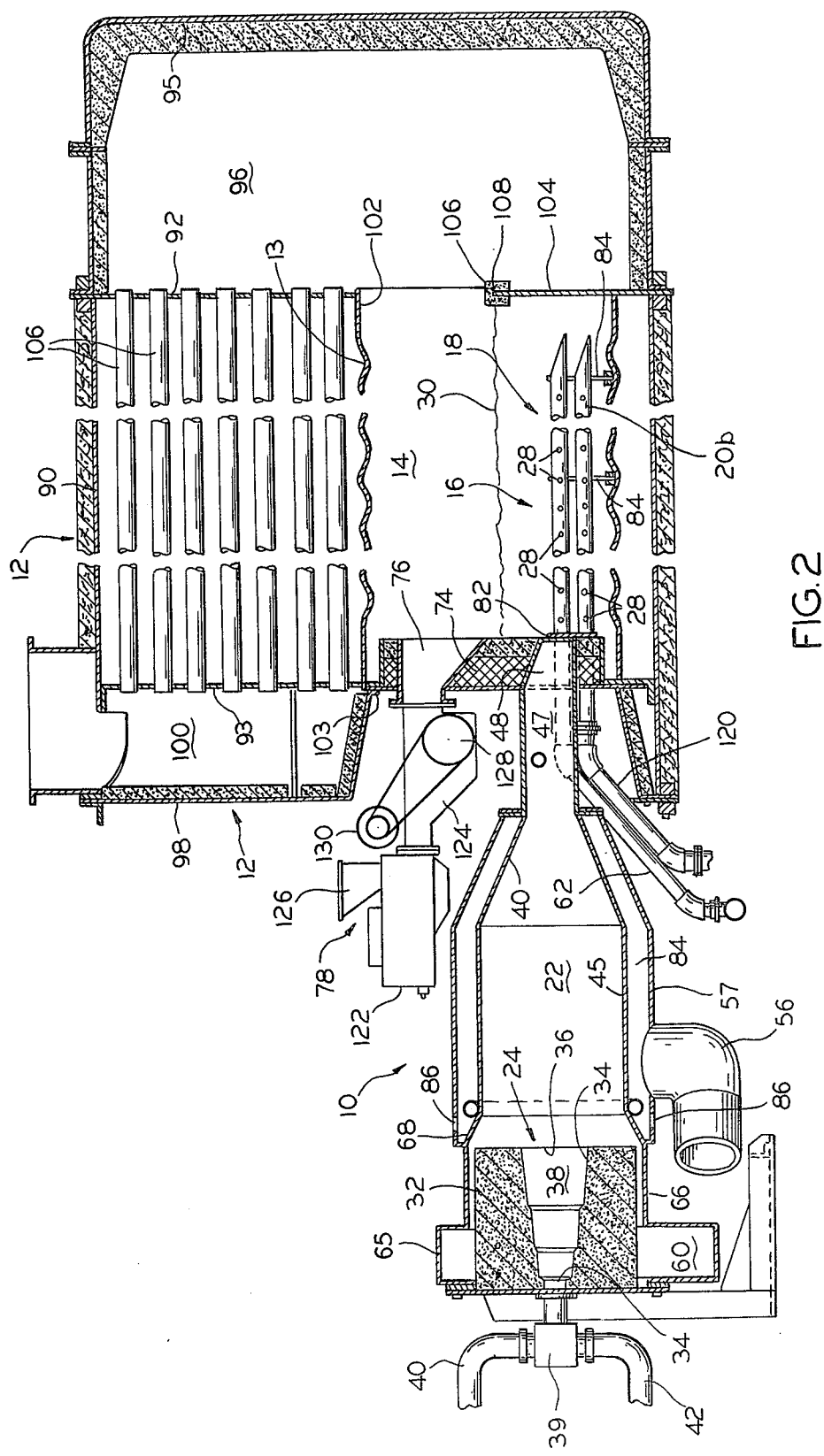
FIG. 2 is a top plan view partly in section of the fluidized bed assembly of FIG. 1.

FIGS. 1 and 2 show a fluidized bed combustion device 10 coupled to a boiler 12. The combustion device includes a tubular container 13 defining a fluidizing chamber 14. An air distribution grid 16 extends generally horizontally across the lower end of chamber 14 and includes a plurality of parallel, generally horizontally oriented, sparge pipes arranged in a row of upper pipes 18a, 18b, 18c, 18d, 18e, 18f and 18g (sometime collectively referred to as pipes 18) and a pair of lower pipes 20a and 20b disposed below pipes 18. The inner ones of sparge pipes 18b, 18c, 18d, 18e and 18f of the upper row are coupled to a combustion chamber 22 for receiving combustion products from a start-up burner 24. While pipes 18 and 20 are shown to be circular in cross-section, pipes having any cross-sectional configuration may be employed. An air delivery system 26 provides combustion air to combustion chamber 22 and to the outer ones 18a and 18g of the upper row. A flue gas recirculation system 27 is also coupled for delivering flue gases to the lower sparge pipes 20a and 20b.

The sparge pipes 18 and 20 each have a plurality of longitudinally spaced apart apertures 28 so that air or combustion products delivered to the pipes will exit apertures 28 at a sufficient volume and velocity to fluidize the particulate material 30 within the chamber 14. The apertures 28 may be at any convenient location in pipes 18 and 20 but are preferably in the side so that relatively larger holes can be used without the bed particles flowing into the pipes. The apertures in adjacent pipes may be staggered for more even air distribution in the bed. The particles 30 are preferably grains of an inert material having a relatively high fusion temperature and a high heat absorption capacity, such as sand.

While the start-up burner 24 may be of any conventional type, a gas burner is shown in the illustrated embodiment. The burner includes a body 32 of refractory material having a central bore 34 which diverges outwardly from its inlet end 36 to its outlet end 38. Coupled to the inlet end 36 of bore 34 is a mixing chamber 39, which in turn is coupled to a gaseous fuel delivery pipe 40 and a primary air delivery pipe 42. As those skilled in the art will appreciate, the gaseous fuel and air are mixed in chamber 39 and delivered to the inlet 36 of bore 34. A pilot or start-up sparking device (not shown) is disposed adjacent the inlet 36 of bore 34 for igniting the gas air mixture delivered thereto. The gas pipe 40 is connected to a suitable source of gaseous fuel (not shown) and may include a modulating or control valve 43. The primary air delivery pipe 42 has a conventional damper 44 and is connected to the air delivery system 26.

The combustion chamber 22 is defined by a generally cylindrical first section 45 which communicates with the outlet end 38 of the start-up burner 24 and a frusto-conical outlet section 46 communicating with one end of a relatively narrower plenum chamber 47. At the opposite end of the plenum chamber 47 there is a distributor 48 having outwardly divergent side walls 49 and a plurality of baffles 50. The inlet ends of tubes 18 open into distributor 48 in the spaces defined by the baffles 50 and side walls 49.

The air delivery system 26 includes a blower 51 consisting of the fan 52 driven by a motor 54. The inlet of fan 46 is connected by a first pipe 56 to a jacket 57 surrounding the combustion chamber 22. The outlet of fan 52 is connected by a second pipe 58 to a scroll chamber 60 which surrounds the start-up burner 24 and by a third pipe 62 to the inlet ends of the outer ones of the upper sparge pipes 18a and 18f.

The scroll chamber 60 is defined by a hollow housing 65 disposed in surrounding relation to the start-up burner 24 and having a constantly increasing radius from its point of connection to pipe 58 to its terminal end. A jacket 66 is disposed adjacent the scroll chamber 60 and in surrounding relation to burner 24 and opens into the scroll chamber at one end and to the large diameter end of a frusto-conical throat section 68, the other end of which is connected to the combustion chamber 22. Air in excess of that required for combustion in chamber 22 is delivered from the scroll chamber 60 through jacket 66 to the inlet end of combustion chamber 22. The eccentric shape of scroll chamber 60 tends to equalize the flow of excess air around the jacket 66.

Pipe 62 is connected to a pair of pipes 70 and 72 which are in turn respectively connected to the out pipes 18a and 18g at the opposite sides of the upper row of sparge pipes 18. A single damper 74 is connected in pipe 62 whereby cool unheated air may selectively be supplied to the outer manifold pipes 18a and 18g for reasons which will be discussed more fully below. Alternately, individual dampers may be provided in pipes 70 and 72 for selective control. A second damper 75 is connected into pipe 58 so that excess air can be delivered to the scroll chamber 60. Primary combustion air can be provided to start-up burner 24 at a controlled rate through pipe 42 and damper 44.

The container 13 which defines the fluidized bed comprises a generally cylindrical housing which is disposed with its axis oriented generally horizontally. Suitably supported at one end of chamber 14 and substantially filling the upstream end thereof is a refractory member 74. A first opening 76 is formed adjacent the upper end of member 74 and is coupled to a fuel delivery system 78 and a second opening is formed adjacent to the lower end of member 74 and defines the distributor 48. A tube sheet 82 is affixed to member 74 on the downstream side of opening 80 and has a plurality of perforations for receiving the inlet ends of sparge pipes 18. The pipes 18 are thus supported at their inlet ends by tube sheet 82 and extend therefrom axiley within container 13 and in a generally horizontal or slightly downwardly inclined direction where their opposite ends are, supported by suitable brackets 84 which, extend upwardly from the lower end of enclosure 13.

The jacket 57 is configured similarly to the combustion chamber housing 45 and is spaced therefrom to define a space 84 therebetween. The small diameter end of jacket 57 is open and there are a plurality of apertures 86 at the large diameter end. As a result of the suction produced by the inlet of fan 52, which is connected to jacket 57 by pipe 56, relatively cool air is drawn into the space 84 through the open end of jacket 57 and the apertures 86. This air then flows to fan 52 through pipe 56 to provide combustion air for the system while additionally performing the function of cooling combustion chamber housing 45.

The boiler 12 may be of any conventional type but in the illustrated embodiment is of the fire tube type. As those skilled in the art will appreciate, a fire tube boiler includes an outer metallic housing 90 which may be insulated in a well-known manner. Extending transversely across the housing 90 are a pair of tube sheets 92 and 93 which are spaced apart a distance substantially equal to the length of container 13. The tube sheet 92 is also spaced from the rear wall 95 of housing 90 to define a fire space 96 and the tube sheet 93 is spaced from the front wall 98 of housing 90 to define a flue space 100. Circular openings 102 and 103 are formed in the lower portions of tube sheets 92 and 93 and are in general registry with the opposite ends of the fluidizing container 13 extending therebetween. A semi-circular gate 104 extends across the lower portion of housing 13 and refractory strip 106 extends across its horizontal upper edge 108. The refractory body 74 is affixed in and extends through the opening 103 at the opposite end of container 13.

A plurality of fire tubes 106 extend between the tube sheets 92 and 93 about the sides of and above the fluidizing container 13. The space between the tube sheets 92 and 93 and around the tubes 106 will be connected in a conventional manner for receiving water to be heated. While the boiler 12 as shown in the drawings to have a single pass between the fire space 96 and the flue space 100, those skilled in the art will appreciate that horizontal partitions (not shown) may extend across each of these spaces for redirecting the hot gases through a plurality of passes so that the maximum quantity of heat can be extracted from the heated combustion products. Also, as seen in FIG. 2, a trap door 110 may be provided in the lower end of fire space 96 for the removal of ashes.

The inlet of a flue gas blower 112 is connected by a conduit 114 to the flue space 100 and its outlet is connected by pipe 116 to a pair of pipes 118 and 120 which are respectively connected to the lower sparge pipes 20a and 20b.

The fuel feeder 78 includes a screw feed device 122 which is connected by a chute 124 to a suitable source of solid fuel such as coal (not shown). The inlet to screw feeder 122 is connected to bin 126 and affixed to the boiler and in registry with opening 76 in body 74. A paddle wheel feeder 128 disposed in bin 124 is driven by a motor 130 for throwing crushed coal through opening 76 and into the bed of fluidizing material 30.

On start-up, damper 74 will be closed and dampers 44 and 75 will be open to the extent necessary to provide the desired fuel air ratio and the desired quantity of excess air to achieve a temperature at the inlet of tubes 18 of about 1600°–1700° F. and to provide the desired gas flow necessary to fluidize the bed 30. It will be appreciated that a conventional air-fuel ratio controller (not shown) is connected to dampers 44 and 75 and to the valve 43 in fuel supply conduit 40. This will insure the desired air-fuel ration for the desired combustion conditions in the manner well known in the art.

The fuel-air mixture is ignited in a conventional manner with the resulting combustion products and the excess air drawn through scroll housing 65 flowing to the plenum chamber 47 and from there to the tubes 18b, 18c, 18d, 18e, and 18f. This will fluidize the central portion of the particulate material 30 which will become heated as the hot gases flow therethrough. Since the damper 74 is closed, no air will be delivered to the outermost sparge pipes 18a and 18g. As a result, the bed material 30 along the edges of the zone will not be fluidized to provide a stagnant insulating zone between the central portion of the bed and the tubular enclosure 13. These stagnant zones reduce the mass of fluidized bed material which must be heated and also act to insulate the fluidized portion of bed from the housing 13. As a result, the fluidized portion of the bed may be raised to the desired temperature more rapidly. When the fluidized central portion of the bed has reached a temperature sufficient to ignite the primary fuel, the latter is injected into the high temperature central bed area by the fuel delivery system 78. The primary fuel will then ignite, further elevating the central bed temperature. When the heat output from the Chamber 13 reaches about fifteen to twenty-five percent of full load, the start-up burner 24 may be shut down.

After the start-up burner has been shut down and as load demand increases, the damper 74 is open to provide fluidizing air to the outer sparge pipes 18a and 18g. This provides fluidizing gases to the previously quiescent zones along the sides of container 13. As a result, the entire bed becomes fluidized and heated by the combustion of the primary fuel.

The use of a separate gas delivery system to the outer sparge pipes 18a and 18g not only permits faster start-up, but also control for the varying load conditions. For example, should the load drop to about fifteen to twenty-five percent of full load, the dampers 74 which provide air to the outside sparge pipes 18a and 18g will again be closed. As a result, only the center portion of the fluidized bed will be active as during start-up. Should the load fall below about fifteen to twenty-five percent of full load, the start-up burner 24 will again be activated to sustain the desired bed temperature.

As those skilled in the art will appreciate, the hot combustion products exiting the fluidizing chamber 14 will pass into the fire space 96 whereupon it will reverse direction and flow though the fire tubes 106 to heat the surrounding water. After passage through the fire tubes 106 in one or more passes, the hot gases will enter the flue space 100 for discharge. In the event it becomes desirable to provide a deeper fluidizing bed, blower 112 is actuated to return flue gases to the lower sparge pipes 20a and 20b. This will tend to provide a deeper fluidizing bed for better heat exchange, but will not increase the total flow of gas through the system. As a result, greater efficiency can be realized.

While only a single embodiment of the invention has been illustrated and described, it is not intended to be limited thereby but only by the scope of the appended claims.

I claim:

1. A fluidized bed combustion device, including means defining a container,
   a unitary bed of fluidizable particulate material disposed within said container and defining a bed,
   a plurality of elongate, tubular gas distributing members arranged in a row and disposed within said container, at least a portion of said particulate material being disposed above said row of tubular members,
   the tubular members which define the central portion of said row comprising a first gas distributing means and the tubular members at the lateral sides of said row comprising respectively second and third gas distributing means,
   said second and third gas distributing means being disposed between said first gas distributing means and said container,
   said tubular gas distributing members each having a plurality of spaced apart perforations formed therein for distributing fluidizing gases along their length and into plural zones within said bed, first gas delivery means coupled to said first gas distributing means for delivering fluidizing gas to said first gas distributing means and air delivery means coupled to said second and third gas distributing means for delivering fluidizing air thereto in a path separate from said first gas delivery means, control means coupled to said first gas delivery means and to said air delivery means and having a first mode to effect delivery of fluidizing gas to said first gas delivery means and for preventing the flow of fluidizing air to said second and third gas delivery means whereby the central portion of the bed will be fluidized while the side portions between said central portion and said container will remain quiescent, said control means also having a second mode for effecting the simultaneous delivery of fluidizing gas to the first gas delivery means and air to said second and third gas delivery means to simultaneously fluidize the entire bed, said combustion device further including a start-up burner and a combustion chamber having a first end and an opposite end, said start-up burner being disposed at the first end of said combustion chamber and said first gas delivery means being coupled to the opposite end of said combustion chamber whereby heated combustion products are delivered therefrom to said first gas distributing means, and, said air delivery means including a fan and a jacket surrounding said combustion chamber and having openings formed therein, the inlet of said fan being connected to said jacket for drawing air through said openings and into the space between said jacket and said combustion chamber and then into the inlet of said fan.

2. The fluidized bed combustion device set forth in claim 1 wherein said air delivery means is also connected to the first gas delivery means for delivering excess air thereto for passage to the first gas distributing means.

3. The fluidized bed combustion device set forth in claim 2 and including means for selectively delivering fuel to said bed and from above the central portion of said gas distributing means.

* * * * *